United States Patent [19]

Bianchi

[11] Patent Number: 4,836,860

[45] Date of Patent: Jun. 6, 1989

[54] METHOD FOR CLEANING SPACECRAFT CRITICAL SURFACES

[75] Inventor: Maurice P. Bianchi, Palos Verdes Estates, Calif.

[73] Assignee: TRW Inc., Redondo Beach, Calif.

[21] Appl. No.: 34,252

[22] Filed: Apr. 6, 1987

[51] Int. Cl.$^4$ .............................................. B08B 17/04
[52] U.S. Cl. .......................................... 134/21; 134/1
[58] Field of Search ....................................... 134/21, 1

[56] References Cited

U.S. PATENT DOCUMENTS 4,698,130 10/1987 Restall et al. ........................ 134/21

Primary Examiner—Asok Pal
Attorney, Agent, or Firm—Noel F. Heal; Sol L. Goldstein

[57] ABSTRACT

Spacecraft components having critical surfaces which must arrive in outer space in a contamination-free, pristine state to assure their effecient operation over the entire spacecraft mission life are protected against contamination by applying to the surfaces a protective coating which sublimes away when exposed to the outer space environment, thereby exposing the surfaces in their pristine state to the environment.

10 Claims, 2 Drawing Sheets

METHOD FOR CLEANING SPACECRAFT CRITICAL SURFACES

BACKGROUND OF THE INVENTION

1. Field:

This invention relates generally to spacecraft components such as mirrors, optical sensors, solar cells and the like having critical surfaces whose contamination would shorten the useful life of the components and thereby also the spacecraft mission life. The invention relates more particularly to a method of protecting such spacecraft components against critical surface contamination until the spacecraft arrives in outer space, and then automatically exposing the protected surfaces in their pristine state to the space environment. The invention relates also to protected spacecraft components of the class described.

2. Prior Art:

As a result of the ever increasing complexity and cost of spacecraft, extending spacecraft mission life has become a primary concern. Extending mission life, in turn, requires extending the useful life of all the spacecraft components. This invention is concerned with contributing to extended spacecraft mission life by extending the useful life of spacecraft components having critical surfaces whose contamination would shorten the useful life of the components. Examples of such components are optical sensors, mirrors including both first and second surface mirrcrs, solar cells, and the like.

Optimum performance of spacecraft components of the class described is dependent upon their arrival in outer space with their critical surfaces in a pristine state and retention of these surfaces in at least a highly efficient state approaching their pristine state over the entire anticipated spacecraft mission life. Optical sensors, mirrors, solar cells, and the like, for example, all have optical surfaces which must retain a high level of transmissibility and reflectivity for longer and longer periods of time.

During fabrication of the components, their critical surfaces are prepared or conditioned to the required pristine state. Unless properly protected afterwards, however, the critcal surfaces can be seiously degraded by atmospheric and other contaminants, both liquid and solid. Optical surfaces are particularly prone to degredation of their optical properties by such contaminants. Moreover, many substances which may contaminate optical surfaces, such as organic polymeric contaminates, may undergo cross-linking of other physical and/or chemical change which causes them to harden and darken when exposed to the outer space radiation environment. This results in further serious degredation of the optical properties of the surfaces.

It is absolutely essential, therefore, that critical surfaces of spacecraft components be kept free of contamination and maintained in their pristine state throughout any production, fabrication and assembly procedures which may occur after conditioning of the surfaces to the desired pristine state. Thereafter, the surfaces must be protected against contamination and maintained in their pristine state during subsequent integration and launch of the spacecrft and transfer of the spacecraft into final orbit or trajectory.

Elaborate cleaning and protection procedures have been devised for maintaining critical spacecraft surfaces free of contamination. Most of these procedures involve mechanical shielding of the surfaces in some way. These prior surface protection procedures, however, are not totally satisfactory and tend to be relatively complicated, costly and otherwise not totally acceptable for spacecraft use.

As explained in the following description, the present invention utilizes a subliming coating, that is a coating wich gasifies directly from the solid state, to protect critical spacecraft surfaces against contamination. Heretofore, subliming materials have been used on space craft to accomplish a variety of useful operative functions. For example:

1. As a time delay, electrical switches.
2. As a temporary mechanical structure.
3. As an encapsulation material for preventing damage during launch to delicate mechanical, electrochemical or optical devices.
4. As a source of impulse for gently controlling the altitude or adjusting the orbit of spacecraft.

U.S. Pat. No. 4,343,964 discloses a subliming material used to cover a tacky substance within an electrical transmission line for ease of handling during fabrication. Sublimation of the material is effected after fabrication to uncover the tacky substance which then catches any particles within the transmission line to prevent shorting. U.S. Pat. Nos. 4,199,620, 4,325,744 and 4,424,079 disclose coatings which are applied to surfaces and then stripped away to remove contaminants, rust and the like, from the surfaces. These latter concepts, while disclosing surface coatings which are removable by sublimination in the the case of U.S. Pat. No. 4,343,964, and are removable to strip away surface contaminents in the case of the other mentioned patents, are obviously not applicable to the problem addressed by this invention, i.e., protecting critical spacecraft surfaces until their arrival in outer space.

A definite need exists, therefore, for an improved critical surface protection technique for shielding critical spacecraft surfaces against contamination and thereby maintaining the surfaces in a pristine state until the spacecraft reaches its final orbit or trajectory in outer space.

SUMMARY OF THE INVENTION

The present invention satisfies this need by providing an improved surface protection method for critical spacecraft surfaces of the class described and improved critical spacecraft surfaces which are protected in accordance with the invention. The invention maintains the protected surface in its pristine state from the time the pristine surface is initially protected in accordance with the invention until the surface arrives in outer space. At this point, the protection provided by the invention is automatically removed or eliminated to expose the still pristine surface to the outer space environment.

The surface protection method of the invention involves preparing a surface to the desired pristine state, applying to the surface a protective coating which sublimes, that is undergoes a phase change from the solid phase directly to the gaseous phase, in an outer space environment. Contaminants which would otherwise contact and contaminate the surface, contact instead and collect in the protective coating. The protected pristine surface is then transported into outer space. When it is exposed to the outer space environment, the protective coating sublimes and carries with it any contaminants on the coating. The surface is thereby exposed in its pristine state to the outer space environment. Being in its pristine state, free of contaminants, the surface retains this state over the spacecraft mission life rather than being slowly degraded by gradual hardening and darkening of surface contaminants by the outer space environment as may occur at the present time.

According to the preferred practice of the invention, two types of sublimable protective coatintgs may be employed. One type of coating is based on materials which sublime when exposed to the hard vacuum of outer space. The other type of coating is based on materials which sublime when exposed to the ultra-violet portion of the solar radiation spectrum.

Figure 1:
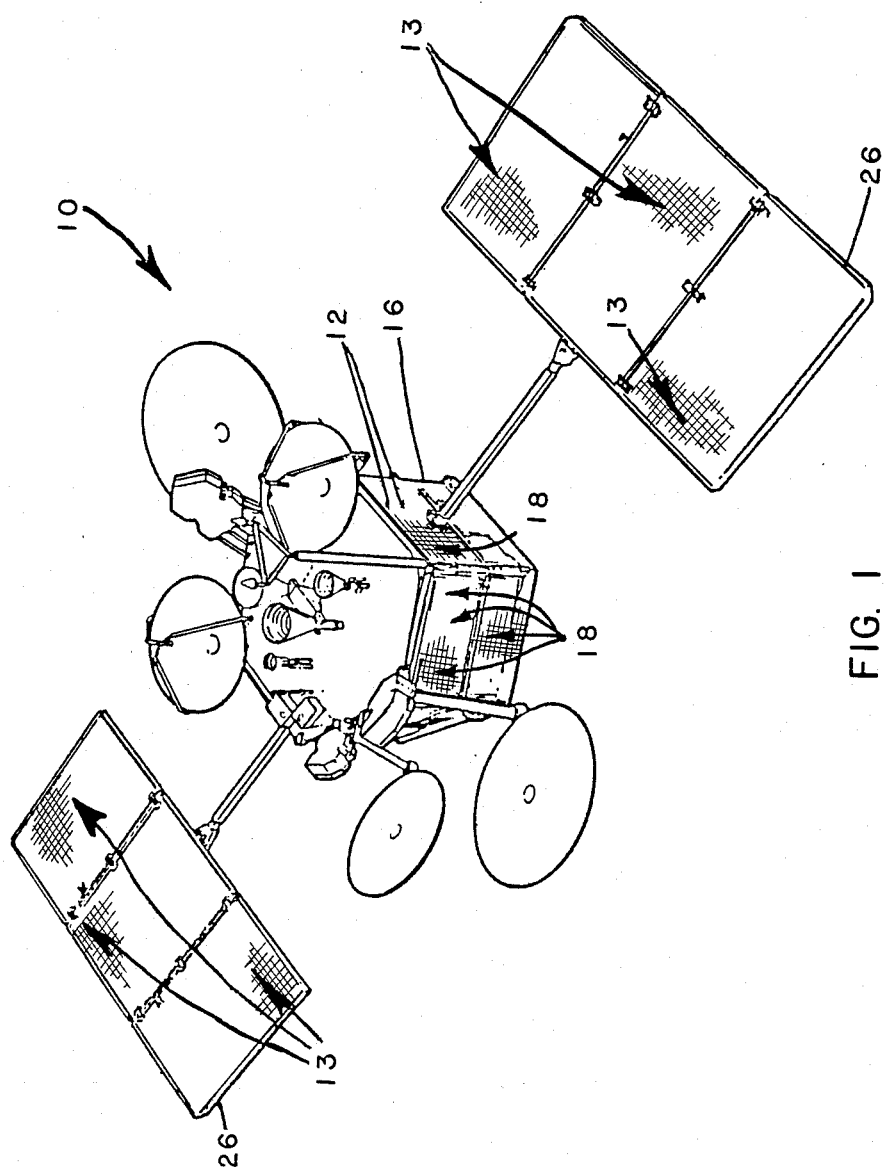
FIG. 1 is a perspective view of a spacecraft having components, in this case thermal control mirror arrays, which are protected against contamination in accordance with the invention.
Figure 2:
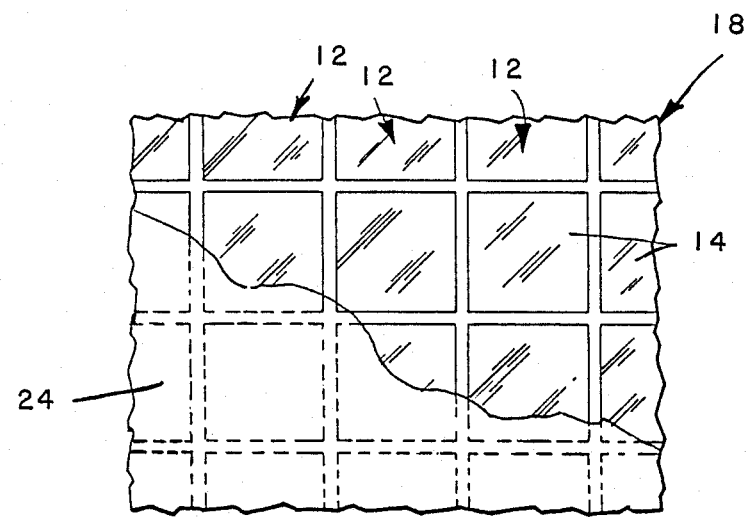
FIG. 2 is an enlarged fragmentary face view of one of the protected mirror arrays.
Figure 3:
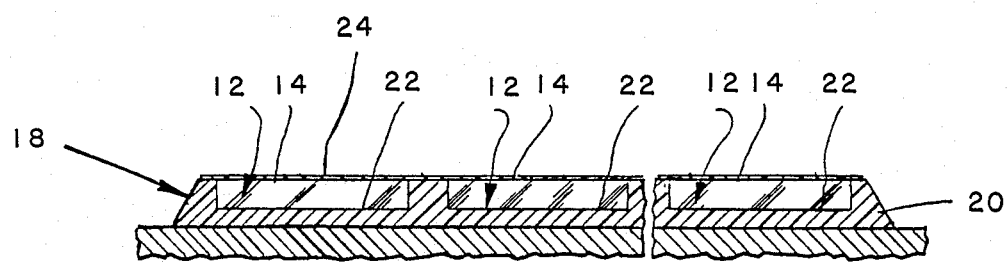
FIG. 3 is a further enlarged section taken on line 3—3 in FIG. 2.

As mentioned earlier, this invention may be utilized to protect virtually any critical spacecraft surface whose contamination would tend to shorten the spacecraft mission life. A few examples, but certainly not a complete listing, of spacecraft components having such critical surfaces are optical sensors, mirrors including both first and second surface mirrors, solar cells, and the like.

The drawings illustrate a spacecraft 10 including components having critical surfaces which are protected in accordance with the invention. The particular components illustrated are second surface mirrors 12 which are mounted on the spacecraft body 16 for effecting a thermal control function and solar cells 13. Except for the critical surface protecion feature of the invention, the spacecraft and its protected components are conventional. Accordingly, there is no need to describe either in elaborate detail.

Suffice to say that the mirrors 12 are arranged about the spacecraft body 16 in mirror arrays 18 and are secured to sides of the spacecraft body in any convenient way, typically by silicon adhesive 20. Each mirror is typically a square of quartz or borosilicate glass on the order of two to two and one-half inches on a side. The rear surface of each square has a metalized reflecting layer 22 such as a vacuum deposited silver layer layer on the order of 100 to 1000 angstroms in thickness. The mirror arrays 18 are located on the spacecraft body in accordance with a thermal analysis performed during the spacecraft design to effect a thermal control function.

In order to enable the mirrors 12 to effectively perform their thermal control function over the entire mission life of the spacecraft 10, the mirrors must retain their high level of transmissibility and reflectivity over the mission life. This requirement will be satisfied only if the mirrors arrive in outer space in the pristine, contamination-free state in which they are initially placed. This means that the outer mirror surfaces, which are their critical surfaces 14, must be totally contamination-free. Any contamination on these surfaces will reduce the transmissibility and reflectivity of the mirrors. Moreover, as noted early, many contaminants will harden and darken when exposed to the outer space environment, thereby further degrading these mirror properties during the spacecraft mission, possibly enough to significantly shorten the mission life.

According to the present invention, the mirrors 12 are maintained in their contamination-free pristine state until they arrive in outer space by a protective coating 24. This protective coating is applied to the critical mirror surfaces 14 while these surfaces are in a pristine, contamination-free state and sublimes away in the outer space environment to expose the mirrors in their prestine state to the environment.

The presently preferred practice of the invention contemplates two types of sublimable protective coatings. One of these coating types, referred to herein as vacuum sublimers, are based on sublimers, i.e., sublimable materials, which rapidly gasify directly from the solid state when exposed to the hard vaccum of outer space. The presently preferred vacuum sublimers are based on camphor, naplthalene, biphenyl or benzoic acid. The sublimation rate of these coatings may be increased by adding coloring agents such as carbon black or organic dye to the coating composition to increase its solar absorptance-to-emittance rates and thereby the equilibrium temperature of the coating when exposed to space solar radiation.

The second type of sublimable protective coating, referred to herein as ultraviolet light sublimers, are based on U.V. photolyzable polymers such as polyphthalaldehydes, polysilanes etc. which readily break down by scission to lower molecular weight fractions when irradiated by the ultraviolet light portion of the solar spectrum. These light fragments then sublime off their substrates in the low ambient pressures of space. Additionally, these polymeric coatings may incorporate in their formulation an appropriate volatilizable sensitizing agent which when irradiated with U.V. light is caused to rearrange or break down to form products, such as a Lewis acid, which attack the chemical bonds of the polymer's main chain in a catalytic manner (reforming the agent after each attack) to cause the polymet to split continuously into smaller and smaller fragments until they are light enough to sublime along with the volatile sensitizer in the low ambient pressures of space. Specific examples of U.V. sublimers are polyphthalaldehyde polymer with a chlorinated triazine sensitizer, and polymethylisopropenyl ketone (PMIPR), and polytertizrybutyl sopropeyl ketone (PTBIPK).

The solar cells 13 are mounted on deployable solar panels 29 attached to the spacecraft body 16. The solar cell surfaces are protected by sublimable coatings in the same way as the mirrors 12.

I claim:

1. The method of maintaining the surfaces of a spacecraft after conditioning to a pristine state protected against contamination when said surfaces are placed in an outer space environment comprising the steps of:

applying to said pristine surface a protective coating to intercept and contain contaminants that would otherwise deposit on and contaminate said pristine surface, said protective coating being adapted to sublime in an outerspace environment, and placing the pristine surfaces coated with said protective coating in said outerspace environment causing the sublimation of said protective coating and carrying with it any contaminants from said surface thereby to expose such surface in its pristine state to said outerspace enviroment.

2. The method of claim 1 wherein said pristine surface is on a spacecraft.

3. The method of claim 1 wherein
said protective coating comprises a material which sublimes when exposed to a vacuum.

4. The method of claim 3 wherein
said protective coating is selected from the group consisting of camphor, naphthalene, biphenyl, benzonic acid.

5. The method of claim 4 wherein
said protective coating contains a coloring additive which increases the solar absorptance-to-emittance rates and thereby also the equilibrium temperature and sublimation rate of the coating when exposed to solar radiation.

6. The method of claim 5 wherein
said coloring additive is selected from the group consisting of carbon black, organic dyes.

7. The method of claim 1 wherein
said protective coating comprises a material which sublimes when exposed to ultraviolet radiation.

8. The method of claim 7 wherein said protecitive coating comprises ultraviolet responsive photolzable polymers selected from the group consisting of polyphthalaldehydes, polysilanes, polymethlisopropenly ketone , polytertiarybutyl, isopropenyl, ketone.

9. The method of claim 8 wherein
said protective coating contains an ultraviolet sensitizing additive which increases the sublimation rate of the coating.

10. The method of claim 9 wherein
said sensitizing additive is selected from the group consisting of benzoquinone.

* * * * *